March 18, 1930.  M. M. FINN  1,750,999

STREET INDICATOR

Filed May 14, 1928  2 Sheets-Sheet 1

Inventor

Matthew M Finn

By Lynn H Latta Attorney

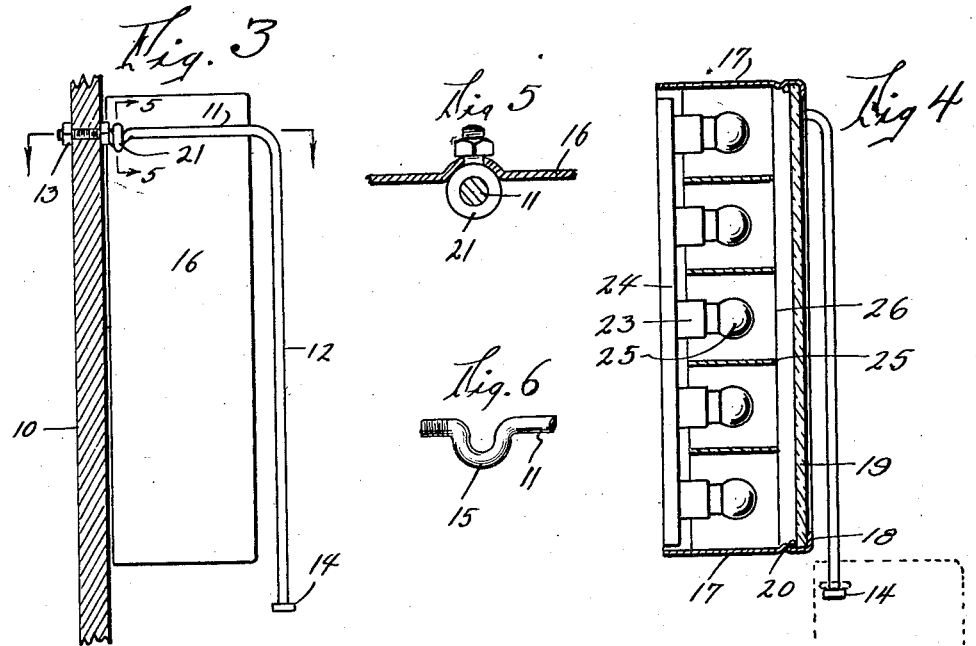

Patented Mar. 18, 1930

1,750,999

UNITED STATES PATENT OFFICE

MATTHEW M. FINN, OF SIOUX CITY, IOWA

STREET INDICATOR

Application filed May 14, 1928. Serial No. 277,661.

My invention relates to street indicators for use on street railway cars, interurbans and the like, and has for its object to provide a display indicator which may be easily read by the occupants of the vehicle and which is electrically controlled by a switch board, conveniently situated near the operator of the vehicle.

More particularly, it is my object to provide such an indicator in conjunction with a directory, the names of the crossings on a particular line being given alphabetically and being numbered and the indicator being adapted to indicate in large characters the number of each street, consecutively.

A further object is to provide such an indicator in which any number from 0 to 1,000 (with a few exceptions) can be displayed, a minimum number of digits for building up the combinations of digits for producing various numbers being employed.

More particularly, it is my object to provide an indicator having a plurality of rows of digits displayed on a transparent or translucent plate, each digit being capable of being illuminated behind the plate by an individual lamp, the digits illuminated serving to indicate to the passenger the number of the crossing for which the motorman is giving the signal.

A further object is to provide such a combination of digits, so arranged that a number may be displayed so as to read from left to right and downwardly, thus to avoid mistakes in reading the numbers.

A still further object of my invention is to provide a suitable casing carrying the digits, together with a panel upon which the individual lamps are mounted, the casing being mounted so that it may be quickly removed to give access to the lamps without entirely removing it.

Finally, it is my object to provide an indicator system including an indicator and a switch board, so constructed as to be readily adaptable to any one of a number of street car lines requiring different information, relative to the names of the crossings.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 3 is a side view of the indicator.

Fig. 4 is a vertical, sectional view through the indicator.

Fig. 5 is a detail, vertical, sectional view taken on the line 5—5 of Fig. 3.

Fig. 6 is a detail view of a portion of the supporting bracket, and,

Fig. 7 is a view of a portion of the directory.

Figures 1, 2:
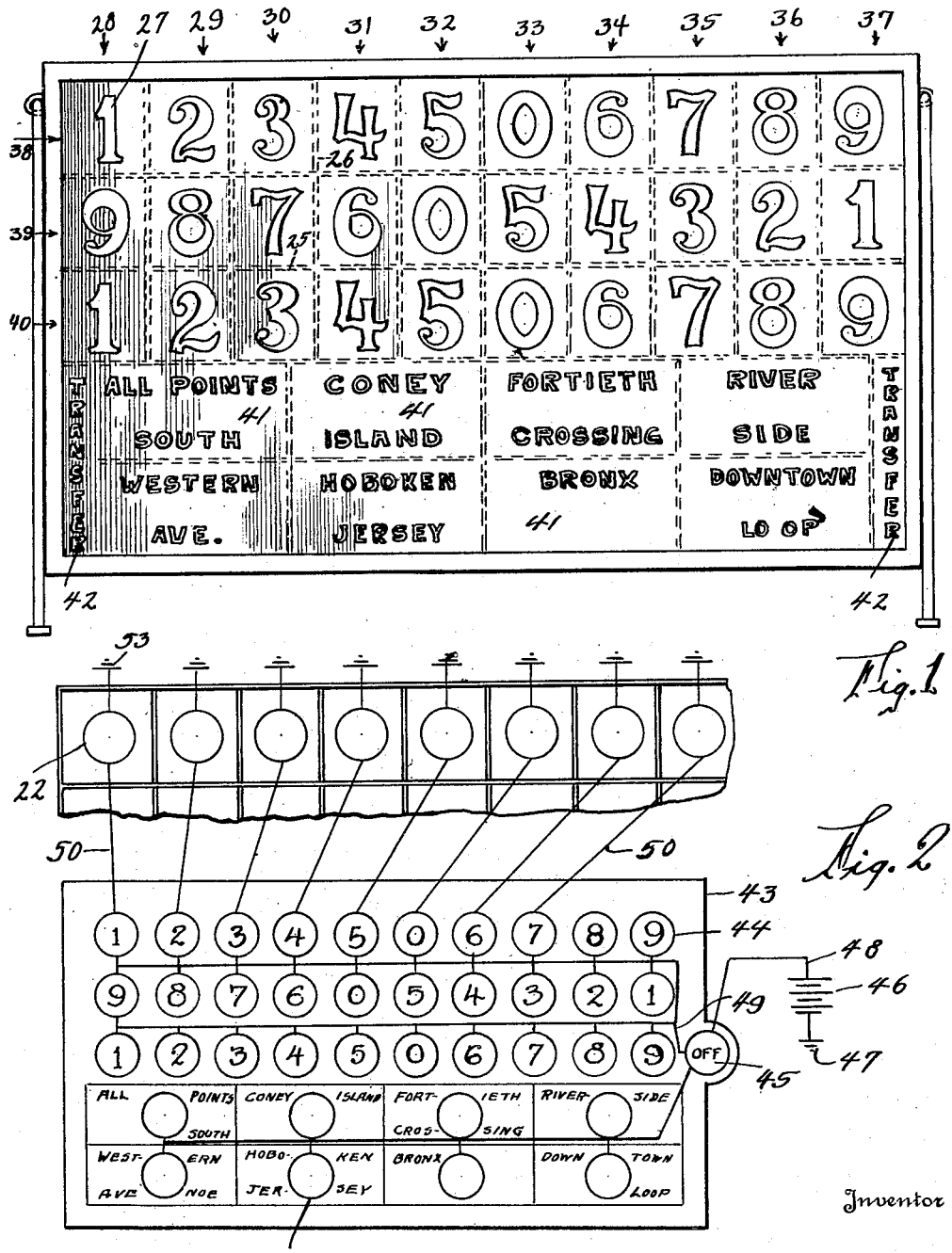
Fig. 1 is a front elevation of the indicator.
Fig. 2 is a front elevation of the switch board, a portion of the wire circuit being shown in diagram.

I have used the reference character 10 in Fig. 3 to indicate generally a portion of one of the walls of a street car or a similar vehicle upon which the indicator may be mounted.

A pair of L shaped brackets are secured to the wall 10 in any manner, such as by means of the nuts 13, threaded upon the arms 11.

The lower ends of the vertical portions 12 are provided with heads 14 and the horizontal arms 11 are provided with U shaped yokes 15.

The indicator casing has the side walls 16, the upper and lower walls 17 and a flange 18 surrounding a sight opening. This opening is closed by a glass 19, which may be held in place by any conventional means such as a loop 26.

In the side walls 16 are a pair of eyes 21, which receive the arms of the brackets and which normally rest in the yokes 15. The yokes 15 are positioned so as to bring the casing substantially in contact with the wall 10 when the eyes 21 are resting within the yokes 18.

By lifting slightly upon the casing, the eyes 21 may then be slid along the arms 11 so as to move the casing 16 directly away from the wall 10, clearing the lamps 22, which are mounted in sockets 23, secured upon a panel 24, which in turn may be secured to the wall 10 by any suitable means, The brackets and panel are so positioned relative to each other that the panel will be snugly inclosed within the casing when the latter is in its normal position shown in full lines in the drawings.

The casing may be dropped vertically after having been moved to a point where the loops 21 have followed the arm around the corner and will be supported upon the heads 14 in its lowered position, as shown in dotted lines in Fig. 4. When in this position, it leaves the panel entirely open for inspection or removal of the lamps 22.

Either the casing or the panel is provided with a plurality of crossed partition members 25 and 26, which form a cellular structure inclosing each lamp in an individual compartment so that light from that lamp will illuminate only a definite portion of the face of the glass 19.

Referring now to Fig. 1, wherein the partitions 25 and 26 are indicated in dotted lines, a digit 27 is imprinted upon the glass 19 in some manner so that it will plainly appear when the glass is illuminated from behind. For instance, the glass may be shaded over all of its surface except the portions occupied by the digits 27 and the light will thus shine through these digits. In an opposite manner, the digits might be painted with an opaque substance and the light allowed to shine around them. I provide ten vertical rows of digits, numbered 28, 29, 30, 31, 32, 33, 34, 35, 36, and 37, respectively, and three horizontal rows of digits numbered 38, 39 and 40, respectively. The first horizontal row includes the following digits in the following order:

1, 2, 3, 4, 5, 0, 6, 7, 8, 9.

The second horizontal row contains the following digits in the following order:

9, 8, 7, 6, 0, 5, 4, 3, 2, 1.

The third row is identical to the first row.

Thus the following arrangement of digits is obtained:

1 2 3 4 5 0 6 7 8 9
9 8 7 6 0 5 4 3 2 1
1 2 3 4 5 0 6 7 8 9

It will now be seen that almost any combination of digits may be had to produce practically any number from 0 to 1,000, and each number read from left to right and downwardly. For instance, the number 123 will be composed of the first three digits in the column 38. The number 122 will be composed of the first two digits in the column 38 and the next to the last digit in the column 39, thus—12
2.
The number 983 will be composed of the first two digits in the column 39 and the third digit in the column 40, thus—98
3.
The numbers 983 up to 989, inclusive, may be used.

Any number from 974 to 979, inclusive, may be used. Any number from 965 to 979, inclusive, may be used.

It will now be noted that each of the columns 38, 39 and 40 include all of the digits from 0 to 9, inclusive. The zeros are placed in the center of the horizontal column for the reason that numbers including 0 are easier to read and are preferable for use over other numbers. Numbers having 0 for their middle digit are easier to remember than most numbers. Placing the zeros in the center makes it possible to obtain every number from 1 to 1,000, which has a 0 for the middle digit.

Below the column 40, a number of divisions 41 are provided, each of which has appropriate wording painted upon the glass in the same manner as the digits 27 to indicate transfer points.

For instance, in a large city employing the cross-town system, a single line may cross as many as a dozen other lines at substantially 90° thereto. A division 42 on either side of the device 41 carries the word "transfer".

The switch board is indicated generally at 43 in Fig. 1. It carries a number of push buttons 44, arranged in columns and imprinted with characters identical to those of the indicator. In addition, the switch board has a button 45 for disconnecting the indicator so that it may not be operated.

The electrical circuit includes a source of current 46, which is grounded at 47 and connected by the wire 48 to the button 45. The button thence carries the current by means of a wire 49 to all of the other buttons 44.

Each of the switch buttons 44 is thence connected by an individual wire 50 to its corresponding lamp 22, as shown in Fig. 2. The lamps in turn are grounded, as at 53, so that when any of the buttons on the push board is pressed, its corresponding lamp will light. The entire circuit, includes a number of buttons and a number of lamps in parallel.

The two lamps which light the (transfer), compartments are connected to all of the lamps for the compartments 41 so that when any of the lamps in the compartments 41 are lighted, the word "transfer" will also be illuminated.

The directory is indicated generally at 54 in Fig. 7 and is provided with columns 55 of names of street crossings arranged alphabetically together with columns 56 of numbers corresponding to the particular crossings.

The directory includes every street in the city. The motorman will be provided with a guide sheet, not illustrated in the drawing, including only the names of the streets on his line in their proper order and their corresponding numbers. The streets will preferably be numbered in rotation so that it is only necessary for the motorman to present the next highest number as each street is approached.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a crossing indicator, a casing having a glass covered sight opening, a panel, lamps mounted on said panel, a pair of inverted L-shaped brackets, sliding, pivotal connections between the casing and said brackets, allowing the casing to be first moved away from the panel to clear the lamps and then to be dropped vertically.

2. In a crossing indicator, illuminating means, a panel on which said means is mounted, a casing having a glass covered sight opening, normally covering the illuminating means and panel, a pair of inverted L shaped brackets, provided with horizontal arms secured to the panel and vertical arms depending therefrom, and sliding, pivotal connections between the casing and said bracket arms, allowing the casing to be first moved away from the panel to clear the lamps and then to be dropped vertically.

3. In a crossing indicator, illuminating means, a panel on which said means is mounted, a casing having a glass covered sight opening, normally covering the illuminating means and panel, a pair of inverted L shaped brackets, provided with horizontal arms secured to the panel and vertical arms depending therefrom, and sliding, pivotal connections between the casing and said bracket arms, allowing the casing to be first moved away from the panel to clear the lamps and then to be dropped vertically, said horizontal arms being provided with depressions to receive said connections when the casing is in place covering the panel.

4. In a crossing indicator, illuminating means, a panel on which said means is mounted, a casing having a glass covered sight opening, normally covering the illuminating means and panel, a pair of inverted L shaped brackets, provided with horizontal arms secured to the panel and vertical arms depending therefrom, sliding, pivotal connections between the casing and said bracket arms, allowing the casing to be first moved away from the panel to clear the lamps and then to be dropped vertically, and stops at the lower ends of the vertical arms.

Signed this 8th day of May, 1928, in the county of Woodbury and State of Iowa.

MATTHEW M. FINN.